(12) United States Patent
Inagawa et al.

(10) Patent No.: US 7,913,019 B2
(45) Date of Patent: Mar. 22, 2011

(54) SERVER, AND METHOD OF RECOVERY FROM LINK FAILURE IN SERVER

(75) Inventors: Toru Inagawa, Sagamihara (JP); Satoru Uemura, Hadano (JP); Takeshi Yoshida, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 119 days.

(21) Appl. No.: 12/331,991

(22) Filed: Dec. 10, 2008

(65) Prior Publication Data

US 2009/0182916 A1 Jul. 16, 2009

(30) Foreign Application Priority Data

Dec. 20, 2007 (JP) ................................. 2007-329102

(51) Int. Cl.
*H05K 7/10* (2006.01)
(52) U.S. Cl. .......... 710/301; 710/15; 710/104; 710/302; 710/305; 713/324; 714/43; 714/56
(58) Field of Classification Search .................. 710/104, 710/301, 302, 15; 714/43, 56; 713/300–330
See application file for complete search history.

(56) References Cited

U.S. PATENT DOCUMENTS

| | | | | |
|---|---|---|---|---|
| 5,815,647 A * | 9/1998 | Buckland et al. | .................. | 714/3 |
| 5,875,310 A * | 2/1999 | Buckland et al. | .............. | 710/309 |
| 6,151,647 A * | 11/2000 | Sarat | ............................. | 710/301 |
| 6,311,296 B1 * | 10/2001 | Congdon | ........................ | 714/56 |
| 6,658,507 B1 * | 12/2003 | Chan | .............................. | 710/100 |
| 6,715,019 B1 * | 3/2004 | Benson et al. | ................ | 710/305 |
| 6,807,596 B2 * | 10/2004 | Erickson et al. | .............. | 710/301 |
| 6,950,896 B2 * | 9/2005 | Scordalakes et al. | ......... | 710/301 |
| 7,188,263 B1 * | 3/2007 | Rubinstein et al. | ........... | 713/300 |
| 7,231,560 B2 * | 6/2007 | Lai et al. | ........................ | 714/712 |
| 7,353,443 B2 * | 4/2008 | Sharma | ......................... | 714/742 |
| 7,356,636 B2 * | 4/2008 | Torudbakken et al. | ........ | 710/313 |
| 7,365,454 B2 * | 4/2008 | Morrow | ......................... | 307/140 |
| 7,437,643 B2 * | 10/2008 | Khanna et al. | ................ | 714/733 |
| 7,447,822 B2 * | 11/2008 | Wu | ................................ | 710/302 |
| 7,539,801 B2 * | 5/2009 | Xie et al. | ....................... | 710/104 |
| 7,574,551 B2 * | 8/2009 | Gundam et al. | .............. | 710/313 |

(Continued)

FOREIGN PATENT DOCUMENTS

EP 1746489 1/2007
WO 2005/057414 6/2005

OTHER PUBLICATIONS

PCI-SIG. PCI Express Base Specification. Revision 1.0. Apr. 29, 2002.*
Perftrends. PCI-XP Controller. Data Sheet. Jul. 21, 2004.*
Regula, Jack. Using Non-transparent Bridging in PCI Express Systems. Jun. 1, 2004.*

(Continued)

*Primary Examiner* — Matthew D Spittle
(74) *Attorney, Agent, or Firm* — Mattingly & Malur, P.C.

(57) ABSTRACT

In a server composed of a server module having a processor in it, an I/O module having an I/O extension slot for accommodating an I/O extension adapter to expand the server's I/O capability, and a management module managing the entire server, the server module and the I/O extension slot (and through it, ultimately the I/O extension adapter) are interconnected using a PCI Express interface and the I/O module and the management module are interconnected using a special interface carrying detection information indicating whether an I/O extension adapter is actually mounted on the I/O extension slot. In the event of a link failure on the PCI Express interface, link recovery is attempted by grasping the status of the link based on the detection information obtained through the special interface.

8 Claims, 3 Drawing Sheets

U.S. PATENT DOCUMENTS

| | | | |
|---|---|---|---|
| 7,721,031 B2 * | 5/2010 | Tseng et al. | 710/105 |
| 7,730,376 B2 * | 6/2010 | Das Sharma | 714/742 |
| 2004/0128576 A1 * | 7/2004 | Gutman et al. | 713/323 |
| 2006/0265449 A1 | 11/2006 | Uemura et al. | |
| 2007/0233928 A1 * | 10/2007 | Gough | 710/301 |
| 2007/0234130 A1 | 10/2007 | Sullivan et al. | |
| 2008/0005706 A1 * | 1/2008 | Sharma et al. | 716/4 |
| 2008/0016405 A1 * | 1/2008 | Kitahara | 714/43 |

OTHER PUBLICATIONS

Innovative Integration. X5-RX PCI Express XMC Module. Data Sheet. Version 0.1. Apr. 12, 2010.*

Xilinx. LogiCORE IP Endpoint Block Plus v1.14 for PCI Express. User Guide. Apr. 19, 2010.*

PCI Express Base Specification, Rev. 1.1.

* cited by examiner

FIG. 3

| # | SERVER MODULE | # | I/O MODULE | |
|---|---|---|---|---|
| 0 | 1 | 0 | 1 | |
| 1 | 1 | | # | I/O EXTENSION SLOT |
| 2 | 1 | | 0 | 1 |
| 3 | 1 | | 1 | 1 |
| 4 | 1 | | 2 | 1 |
| | | | 3 | 0 |
| ⋮ | ⋮ | | ⋮ | ⋮ |
| | | | k | 0 |
| | | ⋮ | ⋮ | |
| i | 1 | m-1 | 0 | |
| i+1 | 0 | m | 0 | |
| | | | # | I/O EXTENSION SLOT |
| | | | 00 | 0 |
| ⋮ | ⋮ | | 1 | 0 |
| | | | 2 | 0 |
| | | | ⋮ | ⋮ |
| n | 0 | | k | 0 |

SERVER, AND METHOD OF RECOVERY FROM LINK FAILURE IN SERVER

CLAIM OF PRIORITY

The present application claims priority from Japanese Patent Application JP 2007-329102 filed on Dec. 20, 2007, the content of which is hereby incorporated by reference into this application.

BACKGROUND OF THE INVENTION

1. Field of the Invention

The present invention relates generally to a server and the method for recovery from a failure in one of its links (hereinafter referred to "link recovery"), and in particular, to link recovery in a server equipped with a PCI Express interface.

2. Description of the Related Art

As the computer system processes more data and the processor becomes faster, the interface for interconnecting various components in the computer system is required to transfer larger amounts of data at higher speeds.

For some time now, the Peripheral Component Interconnect (PCI) has been used widely as an interface for interconnecting various components in the computer system. In more recent years, the serial PCI Express has been catching broader market attention because it realizes high-speed, large-capacity data transfer at low implementation costs. It is now expected to be used widely in a variety of computer systems, from personal computers (PCs) and small-scale servers for front-end use to mission critical servers for back-end use.

Mission critical servers are required to have high system availability. It is important to minimize the possibility of a system down as well as the system's down time. One of the known methods of achieving high availability in a system equipped with a PCI Express interface has been the reduced lane mode of operation, whereby, in the event of a failure in one of the links in the system, an alternative link is configured using those lanes constituting the failing link which are usable, so that the system is kept operating with reduced lanes.

In such an arrangement, link recovery calls for the recognition of whether any receiver is present on the PCI Express interface. Without this information, it is impossible to tell whether the link is failing even though a receiver is present on the interface or it is failing because no receiver is present on the interface; as a result, it is impossible to properly process link recovery. In addressing this problem, PCI Express employs a mechanism called receiver detection during the link training sequence, as defined in the PCI Express Specifications (refer to the Web link below), to determine the presence or absence of a receiver.

"PCI Express Base Specification 1.1a," PCI-SIG <URL: http://www.pcisig.com/specifications/pciexpress/base/>

Receiver detection is a mechanism for detecting the presence or absence of a receiver on a link, whereby, after power-on of the system, the transmitter on the PCI Express interface applies a certain level of voltage to the lanes that make up the link and measures the difference in transition time to determine whether a receiver is present on the link. It takes advantage of the fact that the presence of a receiver pulls down the receiver-side of the AC coupling capacitor inserted between the transmitter and the receiver on the physical signal lines of PCI Express, thereby increasing the load capacitance as seen by the transmitter and lengthening the signal transition by as much time as needed to charge the excess capacitance. This means that the signal transition time is long if a receiver is present on the PCI Express interface, and is short otherwise. This difference is used to determine the presence or absence of a receiver on the interface.

As stated above, the PCI Express interface is also expected to apply to large-scale servers that are used in mission critical systems. With servers of a large form factor such as those, implementing a high-speed interface as fast as, for example, 2.5 GHz results in extended wiring lengths, which makes it difficult to keep the signal quality because of the resulting transmission losses. Therefore it becomes necessary to insert, along the PCI Express interface, a redriver such as an equalizer for compensating transmission losses. The problem, however, is that with the receiver detection mechanism, the insertion of the redriver makes it appear as if there were always a receiver present on the interface, rendering it impossible to determine whether or not an I/O extension adapter is mounted.

As a result, when a link failure occurs on a PCI Express interface in a server, one cannot determine whether one should carry out link recovery, and thus cannot realize high system availability.

SUMMARY OF THE INVENTION

It is, therefore, the object of the present invention to provide a mechanism to determine whether an I/O extension adapter is mounted in a server equipped with a PCI Express interface, thereby making it possible to carry out link recovery.

The server according to the present invention is preferably configured as a server composed of a server module on which a processor is mounted, an I/O module equipped with an I/O extension slot to accommodate an I/O extension adapter for expanding the server's I/O capability, and a management module that manages at least these modules, so configured that the server module and the I/O extension adapter are interconnected using a PCI Express interface, and the I/O module and the management module are interconnected using a special interface carrying detection information for determining whether an I/O extension adapter is mounted, so that in the event of a link failure on the PCI Express interface, the status of the link is determined by the detection information obtained via the special interface.

Further, the method for carrying out link recovery according to the present invention is preferably a method for carrying out link recovery in a server composed of a server module on which a processor is mounted, an I/O module equipped with an I/O extension slot to accommodate an I/O extension adapter for expanding the server's I/O capability, and a management module that manages at least these modules, which mainly consists of a step of interconnecting the server module and the I/O extension slot using a PCI Express interface, a step of interconnecting the server module and the management module using a special interface which carries detection information for determining whether an I/O extension adapter is mounted, and a step of determining, in the event of a link failure on the PCI Express interface, the status of the link using the detection information obtained via the special interface.

The present invention makes it possible, in a server equipped with a PCI Express interface, to determine whether an I/O extension adapter is mounted, by means of a special interface incorporated separately from the PCI Express interface. Thus, in the event of a link failure on the PCI Express interface, the present invention makes it possible to properly carry out link recovery using the detection information indicating whether an I/O extension adapter is mounted, thereby realizing high system availability in a server equipped with a PCI Express interface.

BRIEF DESCRIPTION OF THE DRAWINGS

FIG. 3 is a diagram showing an example of the configuration file in accordance with an embodiment of the present invention.

DESCRIPTION OF THE PREFERRED EMBODIMENT

Figure 1:
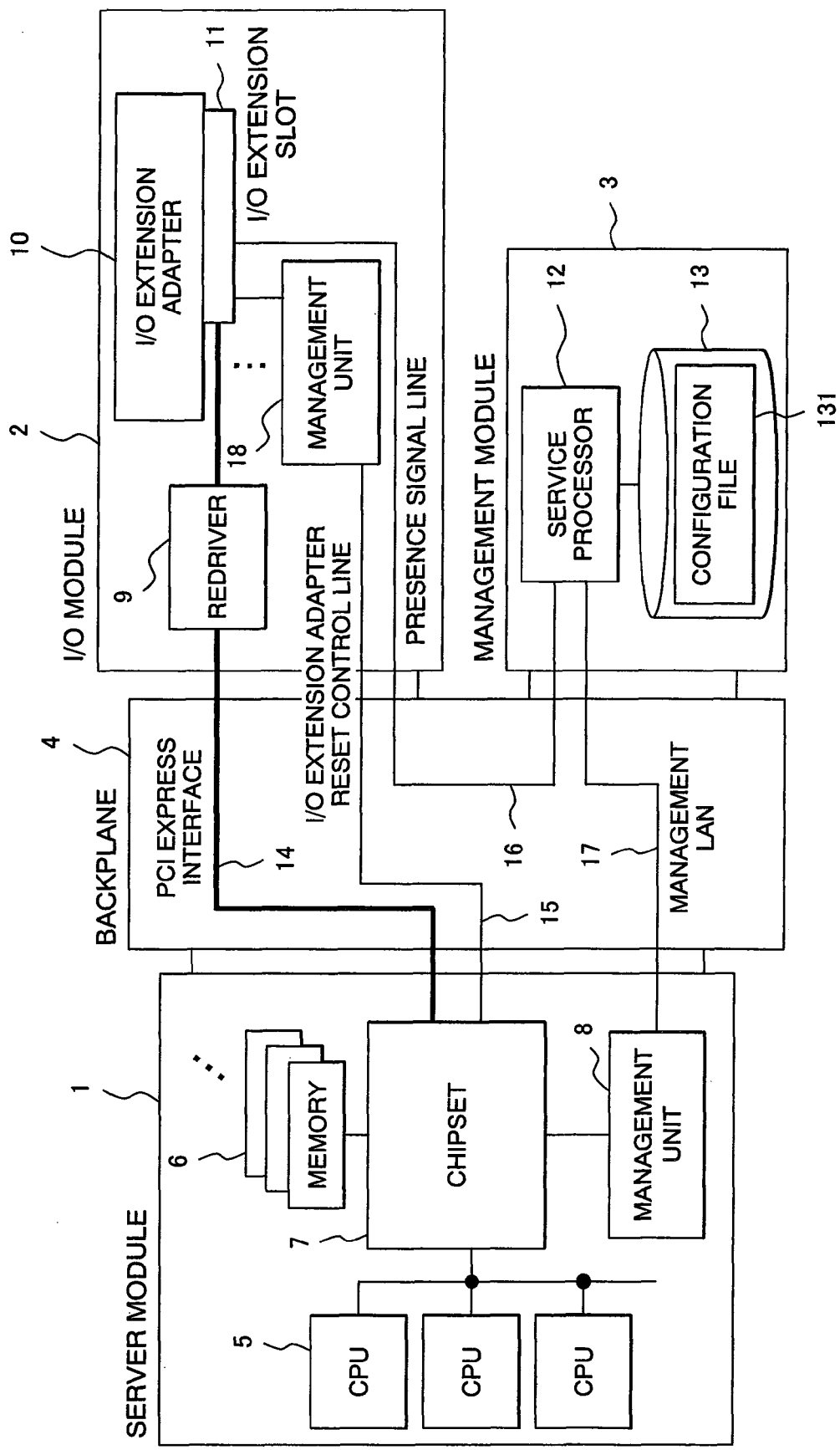
FIG. 1 is a diagram showing the configuration of a server in accordance with an embodiment of the present invention.

Referring now to the drawings, a preferred embodiment is described herein.

As illustrated in FIG. 1, the server is composed of a server module 1, an I/O module 2 equipped with an I/O extension slot 11 to accommodate an I/O extension adapter 10 for expanding its I/O capability, a management module 3 that manages the entire server including the server module 1 and the I/O module 2, and a backplane 4 that interconnects these modules 1-3.

The server module 1 is composed of a processor (CPU) 5, a memory unit 6, and a management unit 8, which are all interconnected using a chipset 7 (namely a logic circuit). The chipset 7 is connected using a PCI Express interface 14, which goes through the backplane 4, to the I/O extension adapter 10 through the I/O extension slot 11 in which it is mounted on the I/O module 2.

The chipset 7 is also connected to a management unit 18 on the I/O module 2 using an I/O adapter reset control line 15. The management unit 8 is connected to the management module 3 using a management LAN 17. Further, the I/O extension slot 11 is connected to the management module 3 using a presence signal line 16 indicating whether an I/O extension adapter is mounted. The backplane 4 accommodates various signal lines that interconnect various modules.

The presence signal line 16 is an interface provided separately from the PCI Express interface 14 and carries detection information that indicates whether an I/O extension adapter 10 is mounted in the I/O extension slot 11.

Further, a redriver 9 is inserted into the PCI Express interface 14 to compensate the transmission loss on it.

The management unit 8 in the server module 1 performs power control of the server module 1 and also reset control of devices mounted on it such as the processor 5 and the memory unit 6. When a link failure is detected on the PCI Express interface 14, the management unit 8 either performs power on/off control of the server module 1 or transmits a signal (reset-request signal), using the I/O extension adapter reset control line 15 via the chipset 7, to the management unit 18 in the I/O module 2, requesting it to reset the I/O extension adapter 10.

The I/O module 2, which is connected to the PCI Express interface 14 on the backplane 4, is equipped with the I/O extension slot 11 into which the I/O extension adapter 10 can be mounted. The I/O module 2 includes a management unit 18, which receives a reset request signal for the I/O extension adapter 10 from the management unit 8 in the server module 1, and resets the I/O extension adapter 10.

The management module 3 receives, with the help of a service processor 12 contained in it, the detection information indicating whether an I/O extension adapter 10 is mounted in the I/O extension slot 11, through the presence signal line 16. The information thus obtained on whether an I/O extension adapter 10 is mounted is stored into a configuration file 131 provided in a storage 13 as the configuration information concerning the I/O extension slot 11. The configuration information concerning the I/O extension slot 11, including whether an I/O extension adapter is mounted, is transmitted to the management unit 8 via the management LAN 17.

As shown in FIG. 3, the configuration file 131 contains the information indicating which of (n+1) server module positions are actually occupied by server modules, which of (m+1) I/O module positions are actually occupied by I/O modules, and for each I/O module, which of (k+1) I/O slots actually have I/O extension adapters mounted in them. A "0" in the flag means the absence ("not mounted") and "1" the presence ("mounted").

The example shown in FIG. 3 indicates that server module positions 0–i are actually occupied by server modules, whereas server module positions (i+1)–n are not occupied. It also indicates that there are (m+1) I/O module positions but only position 0 is actually occupied by an I/O module (with a flag value of "1"), whereas all the other positions are vacant. For I/O module #0, I/O extension slots 0-2 are actually occupied (with a flag value of "1"), whereas all the other slots are vacant (with a flag value of "0").

The backplane 4 is a circuit board for accommodating various interface cables that interconnect various modules. While FIG. 1 shows only one unit each of the server module 1, the I/O module 2 and the I/O extension slot 11, it is possible to install any number of units for each of the server module 1, the I/O module 2 and the I/O extension slot 11 in any positions by changing the wiring of these cables on the backplane 4.

Figure 2:
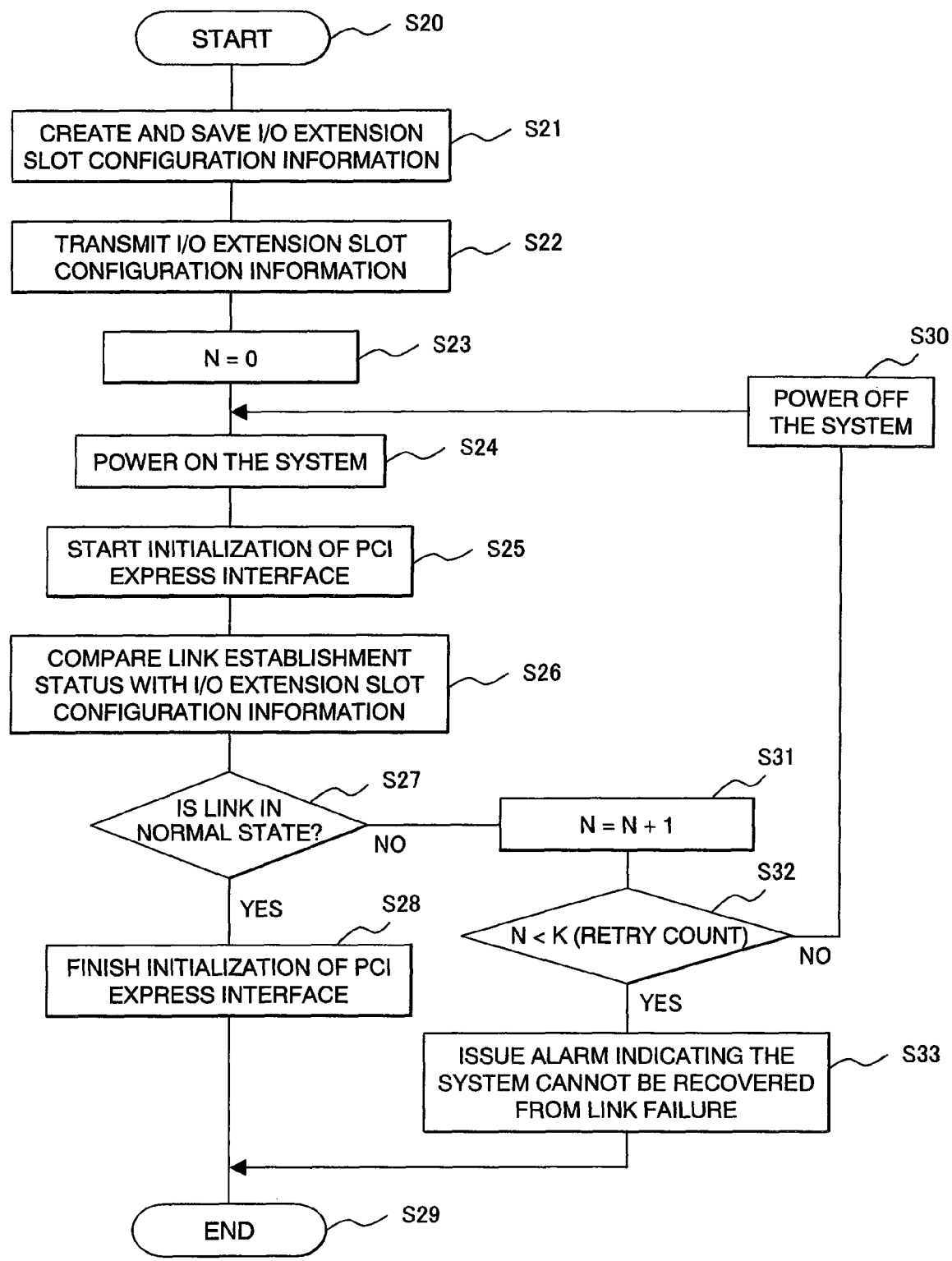
FIG. 2 is a flowchart showing the process of link recovery in the server.

Next, with reference to FIG. 2, an explanation of the link recovery process in the event that a link failure has occurred on the PCI Express interface 14 in the server is in order.

When the I/O extension adapter 10 is mounted in the I/O extension slot 11, the service processor 12 in the management module 3 obtains detection information concerning the I/O extension adapter 10 on the I/O extension slot 11 via the presence signal line 16 and saves it in the configuration file 131 as the configuration information concerning the I/O extension slot 11 (S21).

Upon saving the configuration information concerning the I/O extension slot 11 in the configuration file 131, the service processor 12 transmits it to the management unit 8 via the management LAN 17 (S22).

Upon the system's power-on (S24), the management unit 8 starts initializing the PCI Express interface 14 connected to the I/O extension slot 11 (S25) and compares the status of links established on the PCI Express interface 14 with the configuration information concerning the I/O extension slot 11 received from management module 3 (S26).

If the result of the comparison indicates that even though the I/O extension adapter 10 is mounted no link has been established, the management unit 8 recognizes this fact as a link failure on the PCI Express interface 14 (S27). It then checks the number of actual retries attempted and, if it is less than a predetermined number K (retry count, i.e., the maximum number of retries allowed), powers the server module 1 off (S30) and then on again (S24).

By powering the server module 1 off and then on again, the management module 8 initializes the PCI Express interface 14 again, thereby attempting to recover the PCI Express interface 14 from the link failure.

If the result of the comparison indicates that the status of links matches the configuration information concerning the I/O extension slot 11, the management unit 8 determines that a link has indeed been established on the PCI Express interface 14 and terminates the initialization process (S28).

On the other hand, if the status of links does not match the configuration information concerning the I/O extension slot 11, indicating that a link has not been established, the management module 8 carries out the link recovery process up to K times (S32); if the attempt to establish a link has failed K consecutive times including the first system power-on, the management module 8 issues an alarm indicating that the link failure remains unresolved (S33).

This invention may be practiced or embodied in various ways other than described above, without departing from the spirit or essential character thereof. For example, FIG. 2 shows a link recovery process wherein the management module 8, upon detecting a link failure on the PCI Express interface 14 (S27, No), powers off the server module 1 (S30). However, one can think of another process wherein, under the same situation, the management unit 8 carries out the recovery process by resetting the I/O extension adapter 10 mounted on the I/O module 2, instead of powering off the server module 1. Resetting the I/O extension adapter 10 is equivalent to the re-initialization of the PCI Express interface 14, and therefore can serve as a means for effecting recovery from a link failure on the PCI Express interface 14.

What is claimed is:

1. A server comprising:

a server module equipped with a processor, and an I/O module equipped with an I/O extension slot for accommodating an I/O extension adapter to expand said server's I/O capacity, and a management module managing at least these modules, wherein said server module and said I/O extension slot are interconnected using a PCI Express interface and said I/O module and said management module are interconnected using a special interface carrying detection information indicating whether said I/O extension adapter is actually mounted, said server determining, using said detection information obtained via said special interface, the status of a link on said PCI Express interface in the event of a failure in said link, wherein said management module is equipped with a processing unit determining, using said special interface, whether said I/O extension adapter is mounted or not and a memory unit holding, as configuration information concerning said I/O extension slot, the information obtained by said processing unit indicating whether said I/O extension adapter is mounted or not and said server module is equipped with a first management unit performing power control of said server module and reset control of devices mounted on said server and further wherein said first management unit determines, using said configuration information, whether said link is in normal state.

2. The server according to claim 1, wherein said server module is equipped with a first management unit performing power control of said server module and reset control of devices mounted on said server and is so configured that upon detecting that said I/O extension adapter is mounted, said first management unit carries out a link recovery process by powering said server module off and then on.

3. The server according to claim 1, wherein said I/O module is equipped with a second management unit performing power control of said I/O module and reset control of said I/O extension adapter and is so configured that upon detecting that said I/O extension adapter is mounted, said second management unit carries out link recovery by performing reset control of said I/O extension adapter.

4. The server according to claim 1, wherein said server module is equipped with a first management unit which performs power control of said server module and reset control of the devices mounted on said server and which determines the status of a link by comparing the status of link establishment on said PCI Express interface with the configuration information concerning said I/O extension slot obtained from said management module.

5. A method of link recovery in a server comprising a server module equipped with a processor, an I/O module equipped with an I/O extension slot for accommodating an I/O extension adapter to expand said server's I/O capability, and a management module managing at least said server module and said I/O module, said method of link recovery comprising the steps of:

interconnecting said server module and said I/O extension slot, using a PCI Express interface;

interconnecting said I/O module and said management module, using a special interface carrying detection information indicating whether said I/O extension adapter is mounted; and determining, in the event of a failure in a link on said PCI Express interface, the status of said link using said detection information obtained via said special interface, wherein said management module is equipped with a processing unit and a memory unit and said server module is equipped with a first management unit performing power control of said server module and reset control of devices mounted on said server, configured so that said management module obtains, via said special interface and under the control of said processing unit, detection information indicating whether or not said I/O extension adapter is mounted, creates, based on said detection information, configuration information concerning said I/O extension slot, and saves said configuration information concerning said I/O extension slot in said memory unit, and said first management unit determines, using said configuration information retrieved from said memory unit, whether a link is in normal state.

6. The method of link recovery according to claim 5, wherein, if it is detected that said I/O extension adapter is mounted, a first management unit provided in said server module carries out link recovery by performing power on/off control of said server module.

7. The method of link recovery according to claim 5, wherein, if it is detected that said I/O extension adapter is mounted, a second management unit provided in said I/O module carries out link recovery by performing reset control of said I/O extension adapter.

8. The method of link recovery according to claim 5, wherein said first management unit which is provided in said server module and which performs power control of said server module and reset control of devices mounted on said server, determines the status of a link by comparing the status of link establishment on said PCI Express interface with said configuration information concerning said I/O extension slot obtained from said management module.

* * * * *